US012598364B2

(12) United States Patent
Graciarena et al.

(10) Patent No.: US 12,598,364 B2
(45) Date of Patent: Apr. 7, 2026

(54) MEDIA ATTRIBUTION VERIFICATION

(71) Applicant: SRI International, Menlo Park, CA (US)

(72) Inventors: Martin Graciarena, Belmont, CA (US); John Cadigan, San Diego, CA (US); Alan Taitz, Menlo Park, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 124 days.

(21) Appl. No.: 18/471,171

(22) Filed: Sep. 20, 2023

(65) Prior Publication Data

US 2024/0147025 A1       May 2, 2024

Related U.S. Application Data

(60) Provisional application No. 63/381,863, filed on Nov. 1, 2022.

(51) Int. Cl.
     *H04N 21/83*          (2011.01)
     *H04N 21/81*          (2011.01)
(52) U.S. Cl.
     CPC ........... *H04N 21/83* (2013.01); *H04N 21/814* (2013.01)
(58) Field of Classification Search
     CPC ...................................................... H04N 21/83
     See application file for complete search history.

(56) References Cited

U.S. PATENT DOCUMENTS 11,094,335 B1 *   8/2021   Wang ....................... G10L 25/51
11,238,631 B2     2/2022   Sikka et al.
12,118,306 B2 *  10/2024   Chien ..................... G06F 40/30
2019/0325342 A1  10/2019   Sikka et al.
2020/0134398 A1   4/2020   Kruk et al.
2021/0193174 A1 *  6/2021   Enzinger ................ G10L 17/00
2021/0297498 A1   9/2021   Divakaran et al.
2021/0334908 A1 * 10/2021   Shu ........................ G06Q 50/01
2022/0121868 A1 *  4/2022   Chen ...................... G10L 17/22

OTHER PUBLICATIONS

Albright et al., "Source Attribution of Online News Images by Compression Analysis", 2021 IEEE International Workshop on Information Forensics and Security (WIFS), Dec. 7, 2021, Page ?.

(Continued)

*Primary Examiner* — Hieu T Hoang

(74) *Attorney, Agent, or Firm* — Shumaker & Sieffert, P.A.

(57)                ABSTRACT

In general, the disclosure describes techniques for obtaining, by a computing system, a content item and a purported source for the content item, wherein the content item may include multimodal data. The techniques may further include generating, by the computing system, a plurality of modality feature vectors representative of the multimodal data, wherein each of the generated modality feature vectors has a different, corresponding modality feature. The techniques may further include mapping, by the computing system, the generated modality feature vectors based on a statistical distribution associated with the purported source. The techniques may further include determining, by the computing system, a score based on the mapping. The techniques may further include outputting, by the computing system and based on the score, an indication of whether the content item originated from the purported source.

20 Claims, 6 Drawing Sheets

(56) References Cited

OTHER PUBLICATIONS

Atrey et al., "Multimodal fusion for multimedia analysis: a survey", Multimedia Systems, Apr. 4, 2010, p. 345-379.
Duong et al., "Multimodal Classification for Analyzing Social Media", arXiv, Aug. 7, 2017, 16 pp.
Giachanou et al., "Multimodal Multi-image Fake News Detection", 2020 IEEE 7th International Conference on Data Science and Advanced Analytics (DSAA), Oct. 6, 2020, pp. 647-654.
Goh et al., "Multimodal Neurons in Artificial Neural Networks", Distill, Mar. 4, 2021, 100 pp.
Prince et al., "Probabilistic Linear Discriminant Analysis for Inferences About Identity", 2007 IEEE 11th International Conference on Computer Vision, Oct. 14, 2007, 8 pp.
Radford et al., "Learning Transferable Visual Models From Natural Language Supervision", arXiv, Feb. 26, 2021, 48 pp.
Sargin et al., "Audio-visual Synchronization and Fusion Using Canonical Correlation Analysis", IEEE Transactions on Multimedia, vol. 9, No. 7, Oct. 22, 2007, 9 pp.
Singhal et al., "SpotFake: A Multi-modal Framework for Fake News Detection", 2019 IEEE Fifth International Conference on Multimedia Big Data (BigMM), Sep. 11, 2019, 9 pp.
Van Leeuwen et al., "Channel-dependent GMM and Multi-class Logistic Regression models for language recognition", 2006 IEEE Odyssey—The Speaker and Language Recognition Workshop, Jun. 28, 2006, 8 pp.
Wang et al., "EANN: Event Adversarial Neural Networks for Multi-Modal Fake News Detection", KDD '18: Proceedings of the 24th ACM SIGKDD International Conference on Knowledge Discovery & Data Mining, Aug. 19, 2018, p. 849-857.

* cited by examiner

Figure 2:
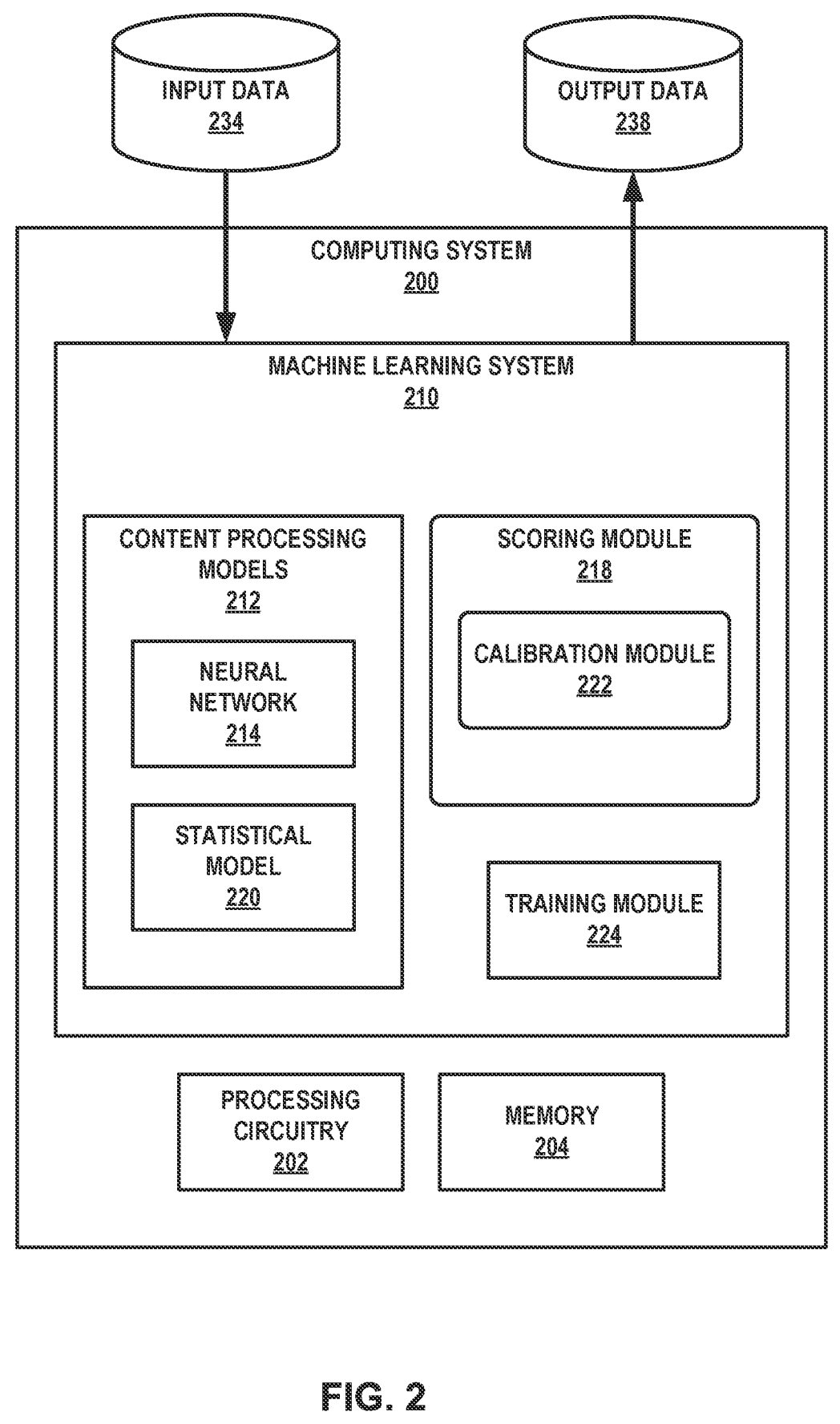

INPUT DATA
234

OUTPUT DATA
238

COMPUTING SYSTEM
200

MACHINE LEARNING SYSTEM
210

CONTENT PROCESSING
MODELS
212

NEURAL
NETWORK
214

STATISTICAL
MODEL
220

SCORING MODULE
218

CALIBRATION MODULE
222

TRAINING MODULE
224

PROCESSING
CIRCUITRY
202

MEMORY
204

MEDIA ATTRIBUTION VERIFICATION

RELATED APPLICATIONS

This application claims the benefit of U.S. Patent Application No. 63/381,863, filed Nov. 1, 2022, which is incorporated by reference herein in its entirety.

GOVERNMENT RIGHTS

This invention was made with U.S. Government support under contract no. HR00112000124 awarded by the Defense Advanced Research Projects Agency (DARPA). The U.S. Government has certain rights in this invention.

TECHNICAL FIELD

This disclosure relates to machine learning systems.

BACKGROUND

Modern technology, such as generative artificial intelligence, has resulted in manipulation of media and false attributions of media to reputable media sources.

SUMMARY

In general, the disclosure describes techniques for verifying source attribution of a multimodal content item. A source attribution verification system may use a machine learning system that applies pre-trained neural networks and probabilistic linear discrimination analysis (PLDA). The source attribution verification system may apply one or more neural networks to encode multimodal data of a content item (e.g., media articles, news article, magazine article, blog post, web page, podcast, television program, or other publication) into modality feature vectors each corresponding to a particular modality feature (e.g., title, body, images, captions, audio, video, etc.) of the content item. The source attribution verification system may apply PLDA to classify characteristics of multiple modalities of a content item. The source attribution verification system may apply PLDA to generate source profiles for media sources based on characteristics associated with the multiple modalities of the media sources.

In addition, the source attribution verification system may receive the content item that purports to originate from a specific media source, such as a particular website, newspaper, magazine, etc. The source attribution verification system may generate modality feature vectors representative of multimodal data of the specific media source. The source attribution verification system may map, graph, or otherwise project the generated modality feature vectors to a lower dimensional subspace based on probabilistic models associated with a source profile corresponding to the specific media source. The source attribution verification system may determine and output an indication (e.g., a probability, ratio, or log likelihood ratio) of whether the purported media source originated from the specific media source, based on the mapping of the modality feature vectors projected in a lower dimensional subspace using on one or more statistical models.

The techniques may provide one or more technical advantages that realize at least one practical application. An example of a source attribution verification systems may use compression analysis of an image from a media article. However, these source attribution verification systems that use compression analysis—or other well-known techniques—are only capable of analyzing one mode (e.g., image) of a media article, while not considering other modes (e.g., text, audio, etc.) of the media article. By contrast, the source attribution verification system of this disclosure may determine characteristic classifications across multiple modal features (images, captions, text, title, audio, video, etc.) included in a received media article. The source attribution verification system may automatically verify claimed sources from input content items written in any language, and without access to a network (e.g., while executing an isolated computing environment). In some instances, the source attribution verification system may enable a media source (e.g., newspaper publisher, book publisher, magazine publisher, print media publishers, blog publisher, website publisher, podcast publisher, television program publisher, broadcasters, etc.) to provide samples of multimodal content items (e.g., media articles, news article, magazine article, blog post, web page, podcast, television program, or other publication) originating from the true, media source to generate a robust source profile that may be used in automatic verification of multimodal content items purporting to originate from the media source. In this way, the source attribution verification system may verify a multimodal content item purporting to originate from a media source with greater accuracy compared to previously implemented methods (e.g., compression analysis of images included in a media source).

In an example, a method includes obtaining, by a computing system, a content item and a purported source for the content item, wherein the content item may include multimodal data. The method may further include generating, by the computing system, a plurality of modality feature vectors representative of the multimodal data, wherein each of the generated modality feature vectors has a different, corresponding modality feature. The method may further include mapping, by the computing system, the generated modality feature vectors based on a statistical distribution associated with the purported source. The method may further include determining, by the computing system, a score based on the mapping. The method may further include outputting, by the computing system and based on the score, an indication of whether the content item originated from the purported source.

In an example, a computing system may include an input device configured to receive a plurality of multimodal data and processing circuitry and memory for executing a machine learning system. The machine learning system may be configured to obtain a content item and a purported source for the content item, wherein the content item may include multimodal data. The machine learning system may further be configured to generate a plurality of modality feature vectors representative of the multimodal data, wherein each of the generated modality feature vectors has a different, corresponding modality feature. The machine learning system may further be configured to map the generated modality feature vectors based on a statistical distribution associated with the purported source. The machine learning system may further be configured to determine a score based on the mapping. The machine learning system may further be configured to output, based on the score, an indication of whether the content item originated from the purported source.

In an example, computer-readable storage media may include machine readable instructions for configuring processing circuitry to obtain a content item and a purported source for the content item, wherein the content item may include multimodal data. The processing circuitry may further be configured to generate a plurality of modality feature vectors representative of the multimodal data, wherein each of the generated modality feature vectors has a different, corresponding modality feature. The processing circuitry may further be configured to map the generated modality feature vectors based on a statistical distribution associated with the purported source. The processing circuitry may further be configured to determine a score based on the mapping. The processing circuitry may further be configured to output, based on the score, an indication of whether the content item originated from the purported source.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 2 is a block diagram illustrating an example computing system that implements a source attribution verification system for source attribution verification, in accordance with the techniques of the disclosure.

FIG. 5 is a block diagram illustrating an example computing system for applying a source profile for source attribution verification, in accordance with the techniques of the disclosure.

Like reference characters refer to like elements throughout the figures and description.

DETAILED DESCRIPTION

In general, aspects of the present disclosure describe techniques for verifying source attribution of a content item, such as the attribution to a particular media source as a source of the content item. A content item may be a news article, magazine article, blog post, web page, podcast, television program, or other publication, which may be published together with an indication that indicates the content item was published by a purported source. The techniques may include a computing system that analyzes the news article to determine an indication (e.g., a probability) of whether the news article was published by the purported source. The computing system may use one or more machine learning models that apply neural networks and/or probabilistic linear discriminant analysis (PLDA) to determine the likelihood the news article was published by the purported source.

Figure 1:
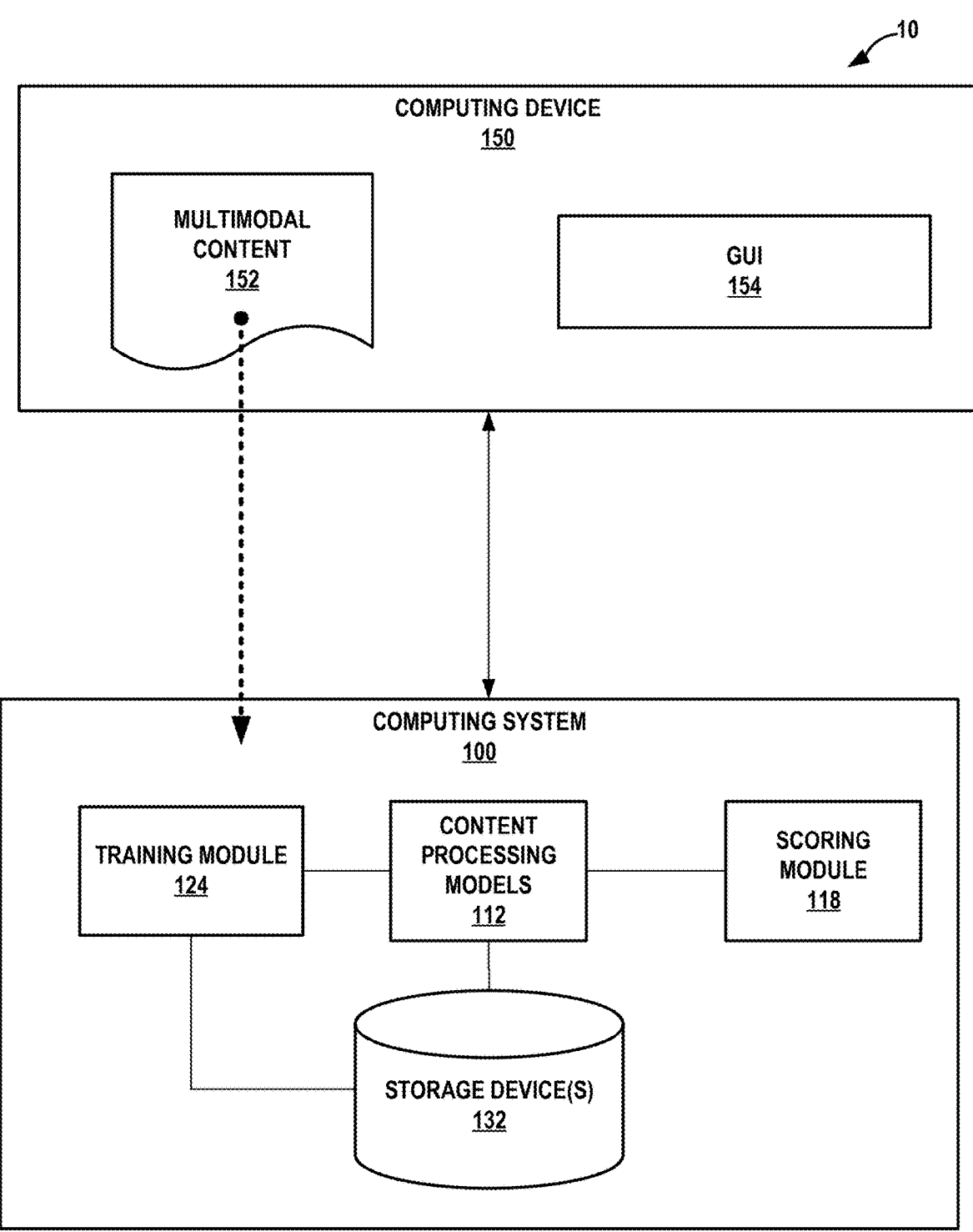
FIG. 1 is a block diagram illustrating an example computing environment that implements a source attribution verification system for source attribution verification, in accordance with the techniques of the disclosure.

FIG. 1 is a block diagram illustrating an example computing environment 10 that implements a source attribution verification system for source attribution verification, in accordance with the techniques of the disclosure. Computing environment 10 may include computing system 100 and computing device 150. Computing device 150 may include be a mobile computing device, such as a mobile phone (including a smartphone), a laptop computer, a tablet computer, a wearable computing device, or any other computing device. In the example of FIG. 1, computing device 150 may include multimodal content 152 and graphical user interface (GUI) 154.

Multimodal content 152 is a content item (e.g., media article, news article, magazine article, blog post, web page, podcast, television program, or other publication) and may include information that may be composed of a plurality of media or data types such as, but not limited to, text, images, video, audio, thumbnails, advertisements, color schemes, fonts and other styles, and/or other information that may be included in a media article. Multimodal content 152 may be in the form of any computer readable format (e.g., portable document format, text file, image file, etc.). Multimodal content 152 may include modality features that correspond to a different modality. For example, multimodal content 152 may include modality features for a textual modality, such as title, body of text, side bars, or captions. Multimodal content 152 may include modality features for a visual modality, such as images, video, etc. Multimodal content 152 may include modality features for an audio modality.

GUI 154 may include a user interface that may be associated with functionality of computing device 150. For example, GUI 154 of FIG. 1 may include a user interface for an application associated with a media verification system such as computing system 100. Although illustrated in FIG. 1 as internal to computing device 150, GUI 154 may be output for display on an external display device. GUI 154 may output an option for a user of computing device 150 to input training data and/or multimodal content 152 for automatic source attribution verification.

In the example of FIG. 1, computing system 100 includes storage devices 132, training module 124, content processing models 112, and scoring module 118. Computing system 100 may represent one or more computing devices communicably coupled via a network and executing a distributed source verification application to implement training module 124, content processing models 112, and scoring module 118. Computing system 100 may include local computing devices and/or a cloud-based environment coupled via a network. Computing system 100 may include one or more computing devices configured to execute training module 124, content processing models 112, and scoring module 118. Storage devices 132 may store information for processing during operation of computing system 100. In some examples, storage devices 132 may include temporary memory, meaning that a primary purpose of storage devices 132 is not long-term storage. Storage devices 132 may be configured for short-term storage of information as volatile memory and therefore not retain stored contents if powered off. Examples of volatile memory include random access memories (RAM), dynamic random access memories (DRAM), static random access memories (SRAM), and other forms of volatile memories known in the art.

Storage devices 132 may include one or more computer-readable storage media. Storage devices 132 may be configured to store larger amounts of information than volatile memory. Storage devices 132 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 132 may store program instructions and/or information associated with modules of computing system 100.

In accordance with the techniques described herein, computing system 100 may verify whether multimodal content 152 originated from a purported source for the multimodal content 152. Computing system 100 may verify multimodal content 152 using source profiles for various media sources (e.g., newspaper publisher, book publisher, magazine publisher, print media publishers, blog publisher, website publisher, podcast publisher, television program publisher, broadcasters, etc.), generated by training module 124 of computing system 100. For example, storage devices 132 may store training data of multimodal content samples originating from a true media source corresponding to the purported source. Such samples may have similar properties as those described above with respect to multimodal content 152 and are exemplars of content items known to have originated directly from the true media source. Training module 124 may obtain the training data from storage devices 132 to generate a source profile for the media source corresponding to the purported source. In some instances, storage devices 132 may store training data received from a user operating computing device 150 and/or computing system 100. In some instances, storage devices 132 may receive the training data directly from a media source. Training module 124 may apply content processing models 112 (e.g., one or more neural networks trained to encode items of a given content type) to encode the multimodal content samples into data sample feature vectors. In some instances, training module 124 may generate data sample feature vectors for each modal feature (e.g., title, body, image, caption, audio, video, etc.) of a multimodal content sample. Training module 124 may generate a source profile by using content processing models 112 to separate the data sample feature vectors into classes or categories based on characteristics (e.g., style of writing, punctuation, citations, style of images, etc.) of the feature vectors.

Training module 124 may generate a source profile by creating a statistical, source model for each feature of a media source to include in the source profile. Training module 124 may apply content processing models 112 (which may include a probabilistic linear discriminant analysis model or other statistical model) to create source models for modality features (e.g., title, body, image, caption, audio, video, etc.) of the media source by mapping the data sample vectors to a lower dimensional subspace. In some instances, training module 124 may generate a source profile that includes source models for each feature included in the multimodal data samples. Training module 124 may create source models for a feature such that data sample feature vectors associated with the feature are mapped, graphed, or otherwise projected in a lower dimensional subspace using the same statistical distribution. Training module 124 may generate a source profile that includes source models with a minimized covariance between the feature vector mappings of the media source associated with the source profile. Training module 124 may generate a source profile that includes source models with a maximized covariance between the feature mappings of the media source associated with the source profile feature mappings of media sources associated with other source profiles. In this way, computing system 100 may generate robust source profiles that identify distinguishing features of content items originating from particular media sources and that may be used in an automated determination of whether multimodal content 152 originated from a purported source.

In operation, computing system 100 obtains multimodal content 152 from computing device 150 to determine whether multimodal content 152 originated from a purported source. Computing device 150 may obtain an indication from a user, via GUI 154, to verify multimodal content 152. The purported source may be indicated within multimodal content 152 or received by computing system 100 separately. Computing system 100 may obtain multimodal content 152 from computing device 150 via a network, wired connection, a wireless connection, a storage device, etc. Computing system 100 may store multimodal content 152 to storage devices 132.

Computing system 100 may provide multimodal content 152 to scoring module 118 to verify whether multimodal content 152 originated from a purported source. Scoring module 118 may apply content processing models 112 (e.g., one or more neural networks trained to encode items of a given content type) to generate multiple modality feature vectors for each modality of multimodal content 152. Content processing models 112 may encode multimodal data of multimodal content 152 into modality feature vectors. Content processing models 112 may encode textual and visual information of each modality of multimodal content 152 into corresponding modality feature vectors. Content processing models 112 may generate modality feature vectors each having a different, corresponding modality feature (e.g., text of an article, images of an article, captions of an article, audio, video, etc.). For example, multimodal content 152 is multimodal in that it includes data conforming to multiple modalities, such as a news article with various textual modalities and various visual (non-text) modalities. Content processing models 112 may encode textual information into modality feature vectors. Content processing models 112 may encode textual information into different modality feature vectors corresponding to a different modality feature (e.g., title of a news article, body of a news article, caption of a news article, video included in a news article, audio included in a news article, etc.). Content processing models 112 may encode textual information for a modality feature (e.g., title of a news article, body of a news article, captions of a news article, etc.) with a rolling window over a length of each string of text using any form of natural language modeling (e.g., contrastive language-image pre-training neural networks). Content processing model 112 may encode visual information for a modality feature (e.g., image in a news article, video in a news article, etc.) with any form of image modeling (e.g., contrastive language-image pre-training neural networks). In some examples, content processing model 112 may include one or more neural networks trained to encode audio information for a modality feature (e.g., audio of a news article) with any form of audio modeling. Content processing models 112 may generate modality feature vectors for each modality feature of multimodal content 152.

Scoring module 118 may map, graph, or otherwise project the generated modality feature vectors to one or more features associated with the purported source in a lower dimensional subspace. For example, scoring module 118 may obtain the source profile associated with the purported source from training module 124 and the modality feature vectors generated by content processing model 112. Scoring module 118 may apply content processing models 112 (e.g., a PLDA machine learning system or other statistical model based systems) to separate the modality feature vectors into classes or categories based on determined characteristics (e.g., news style, journalistic style, style of writing, style of punctuation, style of citations, style of images, style of speech, video styles, etc.) of the modality feature vectors. Scoring module 118 may map, graph, or otherwise project modality feature vectors to a lower dimensional subspace based on the source models created for the source profile associated with the purported source.

Scoring module 118 may determine a score for multimodal content 152. Scoring module 118 may determine a score for multimodal content 152 representative of a likelihood multimodal content 152 originated from a purported source. Scoring module 118 may determine a score for multimodal content 152 based on the mapping of the modality feature vectors to a lower dimensional subspace according to statistical models. Scoring module 118 may compare the data sample feature vector mappings associated with the source profile to the modality feature vector mappings of multimodal content 152. Scoring module 118 may determine a likelihood that multimodal content 152 originated from a source to support a conclusion of whether the multimodal content 152 originated from the purported source. In some instances, scoring module 118 may compare the feature vector mappings of the source profile and multimodal content 152 to generate a raw score value. Scoring module 118 may calibrate or transform the raw score value using multiclass logistic regression to determine the likelihood multimodal content 152 originated from a purported source. Training module 124 may generate parameters used by scoring module 118 when calibrating the raw score value into a likelihood value (e.g., percentage, log-likelihood ratio, etc.).

Computing system 100 may output an indication of whether the multimodal content 152 originated from the purported source. Computing system 100, or more specifically scoring module 118, may output the indication to include the likelihood multimodal content 152 originated from a purported source determined based on the mapping of generated modality features to a lower dimensional subspace. For example, computing system 100 may output an indication of a likelihood value (e.g., percentage, ratio, color, Yes/No, "Verified" or "Not verified" or other text indication, icon or other image, audio indication, etc.) that multimodal content 152 originated from the purported source. Computing system 100 may output the indication computing device 150 for output via GUI 154.

In some instances, computing system 100 may output an indication of whether a multimodal content 152 originated from a purported source based on a threshold probability value. For example, computing system 100 may apply a threshold probability value of 85%. In instances where scoring module 118 determines the likelihood multimodal content 152 originated from the purported source is equal to or greater than 85%, computing system 100 may output a positive indication that multimodal content 152 may have originated from the purported source. In instances where scoring module 118 determines the likelihood multimodal content 152 originated from the purported source is less than 85%, computing system 100 may output a negative indication that multimodal content 152 may not have originated from the purported source.

In some instances, computing system 100 may output an indication of a source in which multimodal content 152 may have likely originated from, where that source is different from the purported source. For example, computing system 100 may map, graph, or otherwise project modality feature vectors of multimodal content 152 to a lower dimensional subspace with statistical models of all available source profiles. Computing system 100 may compare characteristics of each mapping to determine a likelihood multimodal content 152 originated from a source corresponding to a source profile. Computing system 100 may output multiple indications of a likelihood multimodal content 152 may have originated from each source associated with a source profile. In some instances, computing system 100 may output an indication of whether multimodal content 152 originated from other sources that are not the purported source based on scores using source profiles associated with the other sources. In some examples, computing system 100 may output an indication of multimodal content 152 originated from other sources if computing system 100 determined multimodal content 152 did not originate from the purported source.

FIG. 2 is a block diagram illustrating an example computing system 200 that implements a source attribution verification system for source attribution verification, in accordance with the techniques of the disclosure. Computing system 200 of FIG. 2 may be described as an example or alternate implementation of computing system 100 of FIG. 1. As shown in FIG. 2, computing system 200 includes processing circuitry 202 having access to memory 204. Processing circuitry 202 and memory 204 may be configured to execute machine learning system 210 for media source attribution verification according to techniques of this disclosure.

Memory 204 may store information for processing during operation of machine learning system 210. In some examples, memory 204 may include temporary memories, meaning that a primary purpose of the one or more storage devices is not long-term storage. Memory 204 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 204, in some examples, also include one or more computer-readable storage media. Memory 204 may be configured to store larger amounts of information than volatile memory. Memory 204 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 204 may store program instructions and/or data associated with one or more of the modules described in accordance with one or more aspects of this disclosure. Memory 204 may be an example of storage device(s) 132 of FIG. 1.

Processing circuitry 202 and memory 204 may provide an operating environment or platform for machine learning system 210, which may be implemented as software, but may in some examples include any combination of hardware, firmware, and software. Processing circuitry 202 may execute instructions and memory 204 may store instructions and/or data of one or more modules. The combination of processing circuitry 202 and memory 204 may retrieve, store, and/or execute the instructions and/or data of one or more applications, modules, or software. Processing circuitry 202 and memory 204 may also be operably coupled to one or more other software and/or hardware components, including, but not limited to, one or more of the components illustrated in FIG. 2. Processing circuitry 202 and memory 204 may each be distributed over one or more computing devices.

In the example of FIG. 2, machine learning system 210 may implement content processing models 212, scoring module 218, and training module 224. Training module 224, content processing models 212, and scoring module 218 may be an example or alternate implementation of training module 124, content processing models 112, and scoring module 118 of FIG. 1, respectively. Training module 224 may receive input data 234 that may include media article samples associated with a true media source. Training module 224 may apply content processing models 212, or more specifically neural network 214, to generate modality feature vectors for each media article sample. Training module 224 may generate modality feature vectors for each modality (e.g., textual information, visual information, etc.) of the media article sample. Training module 224 may generate modality feature vectors corresponding to each modality feature (e.g., title, body, images, caption, audio, video, etc.) of the media article sample.

In some instances, training module 224 may use statistical model 220 to generate a source profile based on generated modality feature vectors of media article samples originating from a particular media source. Training module 224 may generate a source profile by creating a statistical, source model for features of the media source. Training module 224 may create the source model for the media source by applying statistical model 220 to map, graph, or otherwise project the generated modality feature vectors of the media article samples into a lower dimension subspace. Training module 224 may create a source model for each feature (e.g., title, body, image, captions, audio, video, etc.) of media articles published by a media source. Training module 224 may include each source model in a source profile for a media source.

In operation, computing system 200 may determine a likelihood a multimodal content item originated from a purported source. Computing system 200 may receive input data 234 that may include a multimodal content item (e.g., multimodal content 152 of FIG. 1) and a purported source attribution. Computing system 200 may provide machine learning system 210 with the multimodal content item and the purported source attribution. Content processing models 212 of machine learning system 210 may embed multimodal data of the multimodal content item into modality feature vectors. For example, neural network 214 of content processing models 212 may be pre-trained to extract and embed textual, visual, and/or audio data into vectors of various dimensions (e.g., dimension of 512). Neural network 214 may intrinsically be a multimodal machine learning model. For example, neural network 214 may include, for example, one or more contrastive language-image pre-training neural networks (CLIP-NNs) trained to maximize the cosine similarity between embeddings of pairs of image and text. Neural network 214 may extract embeddings from a visual modality, a textual modality, and/or an audio modality into vectors of a common space. Neural network 214 may include multimodal neurons that respond to the same subject in images, video, audio, and/or text. In this way, neural network 214 may be used as a feature extractor to encode multimodal data of a multimodal content item into multimodal feature vectors. Neural network 214 may generate multimodal feature vectors that each correspond to a different modality feature (e.g., title of an article, text of an article, image(s) of an article, caption(s) of an article, video(s) of an article, audio of an article, etc.).

Scoring module 218 may determine a score corresponding to a likelihood the content item included in input data 234 originated from the purported source. Scoring module 218 may determine a score for the content item by applying statistical model 220 and calibration module 222. Scoring module 218 may obtain the generated modality feature vectors generated from neural network 214. Scoring module 218 may provide the generated modality feature vectors to statistical model 220. Scoring module 218 may additionally provide a source profile associated with the purported source to statistical model 220. In some instances, statistical model 220 may apply probabilistic linear discriminant analysis to map, graph, or otherwise project the generated modality feature vectors to a lower dimensional subspace using corresponding source models for a corresponding feature included in the source profile.

Scoring module 218 may determine the score for a content item. Scoring module 218 may determine a score for the content item based on the mapping of the generated modality feature vectors to a lower dimensional subspace. For example, scoring module 218 may use statistical model 220 to generate a raw score value associated with a comparison of the mapping of the generated modality feature vectors and a source profile corresponding to the true source. Calibration module 222 may calibrate the raw score value to generate a final score for the content item. In some instances, calibration module 222 may generate a final score by transforming or calibrating the raw score value using multiclass logistic regression to compute log likelihood ratios (LLRs). Calibration module 222 may output the computed LLRs as an indication of whether the content item originated from a purported source. In some examples, calibration module 222 may apply a threshold LLR value to determine whether to output a positive, negative, or uncertain indication that the content item originated from a purported source.

Figure 3:
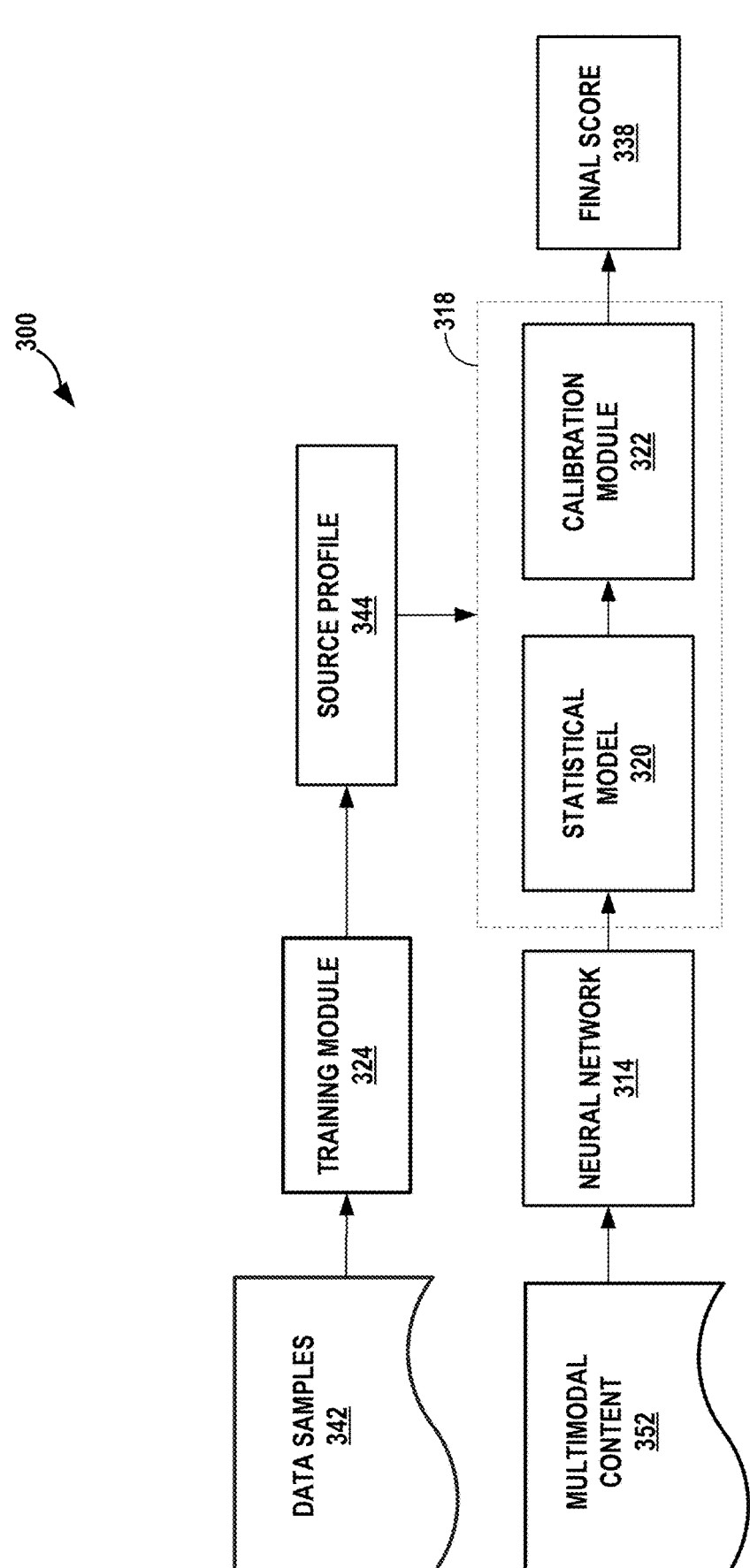
FIG. 3 is a block diagram illustrating an example computing system for generating and applying source profiles for source attribution verification, in accordance with the techniques of the disclosure.

FIG. 3 is a block diagram illustrating an example computing system 300 for generating and applying source profiles for source attribution verification, in accordance with the techniques of the disclosure. Computing system 300 may be described as an example or alternate implementation of computing system 100 of FIG. 1 and/or computing system 200 of FIG. 2. As shown in FIG. 3, computing system 300 may include data samples 342, training module 324, source profiles 344, multimodal content 352, neural network 314, scoring module 318, and final score 338. In the example of FIG. 3, training module 324 may be an example or alternate implementation of training module 124 of FIG. 1 or training module 224 of FIG. 2. Neural network 314, statistical model 320, and calibration module 322 may be an example or alternate implementation of neural network 214, statistical model 220, and calibration module 222 of FIG. 2, respectively.

Training module 324 may process data samples 342 to generate source profiles 344. Training module 324 may obtain data samples 342 from a user operating computing system 300 and/or directly from the true media source publisher. Data samples 342 may include multimodal data representative of sample multimodal media content items from a true media source corresponding to any purported source. Training module 324 may obtain data samples 342 as training data to identify distinguishing characteristics of features (e.g., title, body, images, captions, audio, video, etc.) included data samples 342 that may be attributed to a particular source of data samples 342. Training module 324 may apply one or more neural networks (e.g., neural network 314) to extract multimodal data from a media sample from data samples 342. In some instances, training module 324 may encode multimodal data of the data sample into an embeddings vector to generate multiple modality feature vectors. In some examples, training module 324 may generate modality feature vectors for a particular modality feature (e.g., title, body, images, captions, audio, video, etc.) associated with data samples 342. Training module 324 may generate a modality feature vector by embedding characteristics (e.g., style of writing, style of images, punctuation, citations, etc.) of a corresponding feature into an embeddings vector. Training module 324 may generate modality feature vectors based on data samples 342 to generate source profile 344.

Training module 324 may generate source profile 344 to uniquely identify characteristics of a source associated with data samples 342. Training module 324 may generate source profile 344 to include statistical models that may be applied during the media source verification steps performed by scoring module 318. Source profile 344 may include statistical models for each modality feature associated with a corresponding modality feature vector. Source profile 344 may include source models that represent statistical models for each feature. Source profile 344 may include a source model that includes a probabilistic model generated using PLDA that maps a modality feature vector to a lower dimensional subspace. Source profile 344 may include source models that map a modality feature vector to a lower dimensional subspace according to a statistical model to distinguish characteristics a source associated with source profile 344 from characteristics of other sources. In some instances, source profile 344 may include one source model that maps multiple modality feature vectors to a lower dimensional subspace. In some instances, source profile 344 may include a source model for each modality feature vector.

In operation, computing system 300 may obtain multimodal content 352. Computing system 300 may obtain multimodal content 352 that includes multimodal data such as textual information, visual information, audio information, etc. Computing system 300 may obtain multimodal content 352 from a user operating an external computing device (e.g., computing device 150 of FIG. 1). In some instances, computing system 300 may obtain multimodal content 352 from a storage device internal to computing system 300 (e.g., storage devices 132 of FIG. 1). In any case, computing system 300 may obtain multimodal content 352 as input data (e.g., input data 234 of FIG. 2).

Computing system 300 may generate modality feature vectors. Computing system 300 may generate modality feature vectors by providing multimodal content 352 to neural network 314. Neural network 314 may include one or more pre-trained neural networks that includes multimodal neurons that respond to the same subject in images, text, video, and/or audio. Neural network 314 may include one or more neural networks trained to encode items of a given content type (e.g., images, text, video, audio, etc.). Neural network 314 may extract different modality features (e.g., title, body, images, captions, video, audio, etc.). In some instances, neural network 314 may encode multimodal data associated with each modality feature into a corresponding modality feature vector. In some examples, neural network 314 may fuse multimodal feature vectors for each modality feature into a single, concatenated modality feature vector. Neural network 314 may generate a single modality feature vector for all the modality features of multimodal content 352 by fusing generated modality feature vectors into a concatenated modality feature vector. Neural network 314 may generate a concatenated modality feature vector with dimensions equal to the sum of the dimensions of each modality feature vector fused in the concatenated modality feature vector. Neural network 314 may include, for example, one or more artificial neural networks and may represent any one or more of a deep neural network (DNN), convolutional neural network (CNN), recurrent neural network (RNN), Long Short-Term Memory (LSTM) model, Large Language Model (LLM), and/or Contrastive Language-Image Pretraining (CLIP). In some examples, the computing system 300 may, for any one or more of neural network 314, scoring module 318, or training module 324, apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train the machine learning models.

Computing system 300 may provide the generated modality feature vectors to scoring module 318. Scoring module 318, or more specifically statistical model 320, may obtain and apply source profile 344 to map, graph, or otherwise project the generated modality feature vectors to one or more feature characteristics in a lower dimensional subspace. Statistical model 320 may obtain source profile 344 that corresponds to a source identified as the purported source. Statistical model 320 may apply statistical models included in source profile 344 to map corresponding generated modality feature vectors to one or more feature characteristics associated with the purported source in a lower dimensional subspace. In some instances, statistical model 320 may map each modality feature vector to a corresponding statistical, source model included in source profile 344. Statistical model 320 may map a modality feature vector for a modality feature to a source model of source profile 344 corresponding to the same modality feature. In some examples, statistical model 320 may map a concatenated modality feature vector that includes a fused version of each modality feature vector for modality feature of multimodal content 352. Statistical model 320 may map the concatenated modality feature vector to one or more feature characteristics associated with a concatenated version of a source model included in source profile 344.

Statistical model 320 may determine a score based on the mapping of modality feature vectors to one or more feature characteristics in a lower dimensional subspace. In some instances, statistical model 320 may determine or generate a raw score value for each modality feature vector. Statistical model 320 may determine the raw score values based on a comparison of the mapping of the modality feature vectors associated with multimodal content 352 and the mapping of modality feature vectors associated with data samples 342. In some examples, statistical model 320 may determine raw score values based on a comparison of the mapping of the concatenated modality feature vector associated with multimodal content 352 and the mapping of the concatenated modality feature vector associated with data samples 342.

Computing system 300 may provide raw score values (e.g., feature mapping comparison scores) to calibration module 322. Calibration module 322 may calibrate the feature mapping scores to compute LLRs. Calibration module 322 may compute LLRs that indicate a probability multimodal content 352 originated from a purported source. Calibration module 322 may transform or calibrate raw score values using multiclass logistic regression to generate proper likelihoods used to compute the LLRs. Calibration module 322 may obtain source profile 344 to appropriately calculate LLRs based on models included in source profile 344. Calibration module 322 may obtain parameters used in the transformation of raw score values from training module 324. For example, training module 324 may generate parameters based on data samples 342 that are applied when calibration module 322 uses multiclass logistic regression to transform raw score values to LLRs.

In instances where statistical model 320 maps modality feature vector for each modality feature of multimodal content 352 and generates corresponding raw score values for each modality feature, calibration module 322 may calculate an LLR for each modality feature vector based on the raw score values. Calibration module 322 may fuse each LLR to generate final score 338. For example, calibration module 322 may fuse each LLR using mean extraction, kept maximum absolute value, or a combination sum. Calibration module 322 may output final score 338 as an indication of whether (e.g., a probability, ratio, or log likelihood ratio) multimodal content 352 originated from the purported source.

In instances where statistical model 320 maps a concatenated modality feature vector of multimodal content 352, calibration module 322 may calculate final score 338 by calibrating a raw score value (e.g., the feature mapping score) associated with the mapping of the concatenated modality feature vector. Calibration module may output final score 338 as an indication of whether multimodal content 352 originated from the purported source.

Scoring module 318, or more specifically calibration module 322, may output an indication of a likelihood multimodal content 352 originated from a purported source. In some examples, calibration module 322 may output the indication of whether the content item originated from the purported source based on a threshold LLR value. For example, calibration module 322 may establish a threshold LLR that defines a minimum or maximum LLR value corresponding to a positive indication that multimodal content 352 originated from a purported source, a negative indication that multimodal content 352 did not originate from the purported source, or any other indication of the likelihood multimodal content 352 originated from sources other than the purported source.

Figure 4:
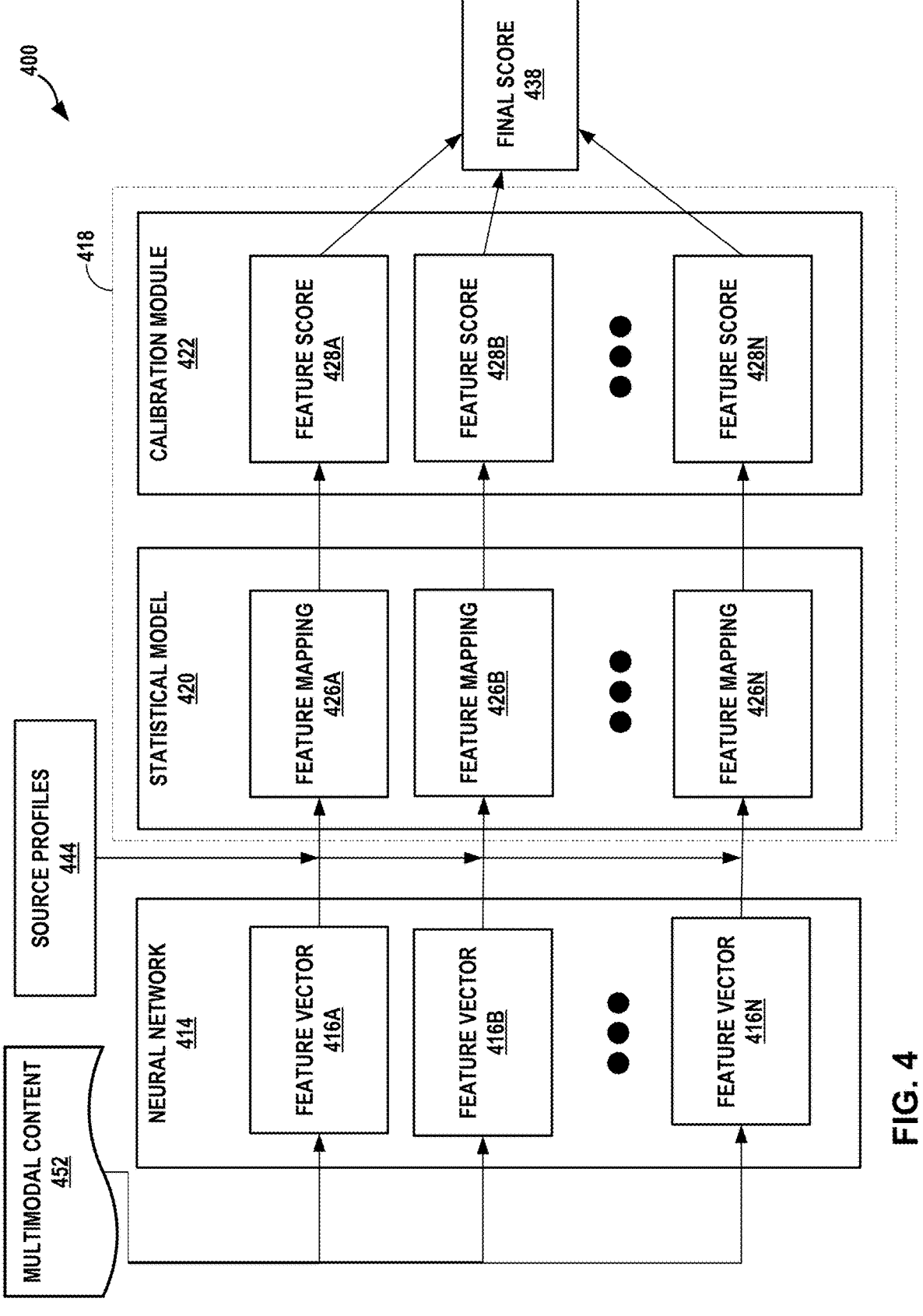
FIG. 4 is a block diagram illustrating an example of a computing system for a late-fusion approach to source attribution verification, in accordance with the techniques of the disclosure.

FIG. 4 is a block diagram illustrating an example of a computing system 400 for a late-fusion approach to source attribution verification, in accordance with the techniques of the disclosure. Computing system 400 may be an example or alternate implementation of computing system 100 of FIG. 1, computing system 200 of FIG. 2, and/or computing system 300 of FIG. 3. In the example of FIG. 4, computing system 400 may include multimodal content 452, source profiles 444, neural network 414, scoring module 418, and final score 438. Neural network 414, statistical model 420, calibration module 422, multimodal content 452, and final score 438 may represent example instances of neural network 314, statistical model 320, calibration module 322, multimodal content 352, and final score 338, respectively, of FIG. 3.

In accordance with the techniques of this disclosure, computing system 400 may provide multimodal content 452 to neural network 414. Neural network 414 may include one or more pre-trained neural networks to extract modality features from multimodal content 452, such as a title, body, images, captions, audio, and/or video. Neural network 414 may include one or more neural networks trained to encode items of a given content type. For example, neural network 414 may encode textual, audio, and/or visual information associated with each of the extracted modality features in feature vector 416A to feature vector 416N (collectively referred to herein as "feature vectors 416"). Neural network 414 may generate feature vectors 416 that may correspond to different modality features. For example, neural network 414 may encode a modality feature associated with a title of multimodal content 452 in feature vector 416A. Neural network 414 may encode a modality feature associated with a body of text of multimodal content 452 in feature vector 416B. Neural network 414 may encode a modality feature associated with captions of multimodal content 452 in feature vector 416C. Neural network 414 may encode a modality feature associated with images of multimodal content 452 in feature vector 416N. Neural network 414 may embed textual information into feature vectors 416 with a pretrained text model with a rolling window over the length of each piece of text. Neural network 414 may embed visual information into feature vectors 416 with a pretrained image model.

Computing system 400 may provide feature vectors 416 and source profiles 444 to scoring module 418. Scoring module 418, or more specifically statistical model 420, may map each of feature vectors 416 to a lower dimensional subspace using statistical source models included in a source profile of source profiles 444. Statistical model 420 may map, graph, or otherwise project feature vectors 416 to a lower dimensional subspace according to the source models of source profiles 444 to generate feature mapping 426A to feature mapping 426N (collectively referred to herein as "feature mappings 426"). For example, statistical model 420 may apply PLDA to map feature vector 416A to a lower dimensional subspace corresponding to a source model to generate feature mapping 426A. Statistical model 420 may map feature vector 416B to a lower dimensional subspace corresponding to a source model to generate feature mapping 426B. Statistical model 420 may map feature vector 416C to a lower dimensional subspace corresponding to a source model to generate feature mapping 426C. Statistical model 420 may map feature vector 416N to a lower dimensional subspace corresponding to a source model to generate feature mapping 426N.

In some examples, statistical model 420 may generate feature mappings 426 for different source profiles included in source profiles 444. For example, statistical model 420 may generate a set of feature mappings 426 for a first media source with a source profile and a second set of feature mappings 426 for a second media source with a different source profile. In this way, computing system 400 may determine whether (e.g., a probability, ratio, or log likelihood ratio) multimodal content 452 originated from a source that is not the purported source.

Statistical model 420 may generate feature mappings 426 that indicate a comparison of the statistical distribution of feature vectors 416 to a statistical distribution of generated feature vectors associated with training data associated with a source multimodal content 452 purports to be from. In some examples, feature mappings 426 may include raw score values associated with a comparison of the mappings of feature vectors 416 and source profiles 444. Statistical model 420 may provide feature mappings 426 (e.g., raw score values for a corresponding feature vector 416) to calibration module 422 to calculate feature score 428A to feature score 428N (collectively referred to herein as "feature scores 428"). For example, calibration module 422 may calculate feature score 428A by transforming the comparison of statistical distributions included in feature mapping 426A (e.g., raw score value associated with feature vector 416A) using multiclass logistic regression. Similarly, calibration module 422 may calculate feature score 428B by transforming feature mapping 426B (e.g., raw score value associated with feature vector 416B) using multiclass logistic regression. Calibration module 422 may calculate feature score 428C by transforming feature mapping 426C (e.g., raw score value associated with feature vector 416C) using multiclass logistic regression. Calibration module 422 may calculate feature score 428N by transforming feature mapping 426N (e.g., raw score value associated with feature vector 416N) using multiclass logistic regression. Calibration module 422 may use multiclass logistic regression to generate proper likelihoods associated with raw scores included in respective feature mappings 426. Calibration module 422 may use the generate proper likelihoods to compute feature scores 428. Feature scores 428 may include log likelihood ratios (LLRs) associated with a likelihood a corresponding modality feature associated with feature mappings 426 originated from a purported source with a source profile included in source profiles 444.

Scoring module 418, or more specifically calibration module 422, may fuse feature scores 428 to output final score 438. Calibration module 422 may fuse feature scores 428 using different fusion techniques. For example, calibration module 422 may fuse feature scores 428 using keeping maximum absolute value, extracting the mean, and/or summing. Calibration module 422 may output final score 438. Final score 438 may include an indication of whether (e.g., a probability) multimodal content 452 originated from a source associated with the source profile of source profiles 444 that was used to generate feature mappings 426.

Figure 5:
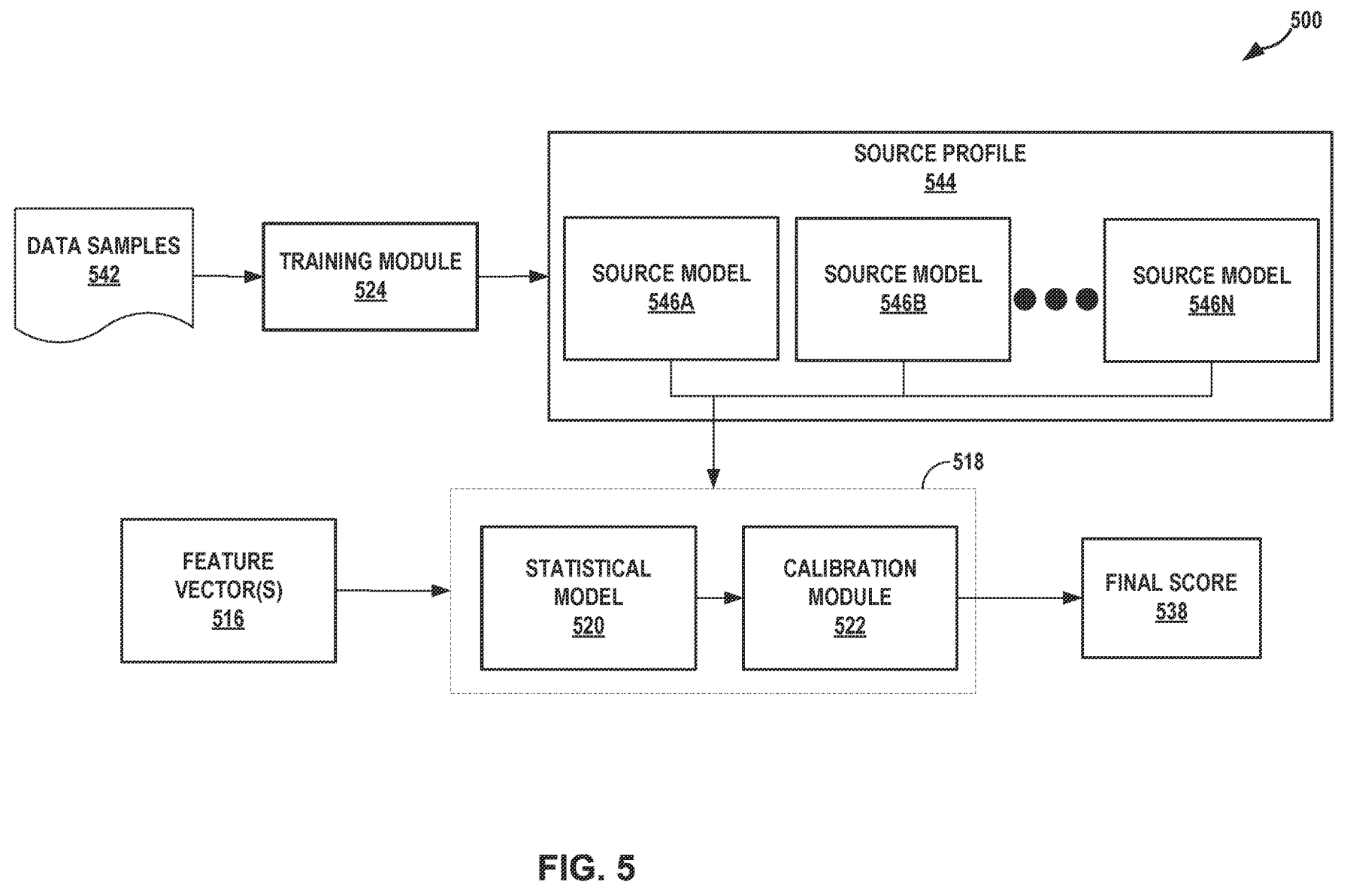

FIG. 5 is a block diagram illustrating an example computing system 500 for applying a source profile for source attribution verification, in accordance with the techniques of the disclosure. Computing system 500 may be an example or alternate implementation of computing system 100 of FIG. 1, computing system 200 of FIG. 2, computing system 300 of FIG. 3, and/or computing system 400 of FIG. 4. As shown in FIG. 5, computing system 500 may include data samples 542, training module 524, source profile 544, feature vectors 516, scoring module 518, and final score 538. Data samples 542, training module 524, source profile 544, scoring module 518, and final score 538 may represent example instances of data samples 342, training module 324, source profile 344, scoring module 318, and final score 338, respectively, of FIG. 3. Source profile 544, feature vectors 516, scoring module 518, and final score 538 may represent example instances of source profile 444, feature vectors 416, scoring module 418, and final score 438, respectively, of FIG. 4.

In accordance with the techniques of this disclosure, computing system 500 may provide data samples 542 to training module 524. Data samples 542 may include sample multimodal content items from a true media source. Training module 524 may apply one or more content processing models (e.g., content processing models 112 of FIG. 1) to generate source profile 544. For example, training module 524 may apply one or more pre-trained neural networks to extract textual, audio, and/or visual information associated with different modality features included in data samples 542. Training module 524 may use the one or more neural networks to embed the textual, audio, and/or visual information into modality feature vectors. In some examples, training module 524 may fuse the modality feature vectors into a concatenated modality feature vector. Training module 524 may create a concatenated modality feature vector to reduce the number of source models included in source profile 544.

Training module 524 may map the generated modality feature vectors to a lower dimensional subspace corresponding to source models. In the example of FIG. 5, training module 524 may use PLDA to map—to a lower dimensional subspace—a modality feature vector associated with the modality feature of a title of data samples 542 to generate source model 546A. Training module 524 may map a modality feature vector associated with the modality feature of a body of text of data samples 542 to generate source model 546B. Training module 524 may map a modality feature vector associated with the modality feature of one or more captions of data samples 542 to generate source model 546C. Training module 524 may map a modality feature vector associated with the modality feature of one or more images of data samples 542 to generate source model 546N. Training module 524 may map the modality feature vectors to a lower dimensional subspace such that samples of data samples 542 are modeled using the same statistical distribution. Training module 524 may generate source models 546 to minimize within-class covariance of mappings of samples of data samples 542. Training module 524 may generate source models 546 to maximize between-class covariance of mappings of samples originating from another source not associated with data samples 542. In this way, source models 546 of source profile 544 may be applied to make predictions of new, unseen multimodal data purporting to originate from the source associated with source profile 544.

In operation, computing system 500 may determine whether a multimodal content item originated from a purported source associated with source profile 544. In the example of FIG. 5, computing system 500 may generate feature vectors 516 by embedding textual, audio, and/or visual information of a multimodal content item. Computing system 500 may generate feature vectors 516 with one or more pre-trained neural networks. In some instances, computing system 500 may generate a feature vector for each modality feature extracted from the multimodal content item. In some examples, computing system 500 may fuse the feature vectors for each modality feature into a concatenated feature vector.

Computing system 500 may provide feature vectors 516 and source profile 544 to scoring module 518. Scoring module 518, or more specifically statistical model 520 may map, graph, or otherwise project feature vectors 516 to a lower dimensional subspace according to source models 546. For example, statistical model 520 may project feature vector 516 to a lower dimensional subspace according to statistical distributions defined in each of source models 546. In some examples, statistical model 520 may map, graph, or otherwise project a concatenated or fused feature vector 516 to a lower dimensional subspace according to each of source models 546. In some examples, training module 524 may have generated source model 546A based on a concatenated or fused modality feature vector generated from data samples 542. In such examples, statistical model 520 may map, graph, or otherwise project the concatenated or fused feature vector 516 to a lower dimensional subspace according to source model 546A which represents a concatenated or fused statistical source model. Statistical model 520 may map feature vectors 516 to one or more feature characteristics associated with the purported source in a lower dimensional subspace. Statistical model 520 may map feature vectors 516 to one or more feature characteristics that were determined as distinguishing characteristics of the purported source.

Scoring module 518 may determine final score 538 based on the mapping of either a plurality of modality feature vectors or a concatenated feature vector—created by statistical model 520—to a lower dimensional subspace. Scoring module 518 may calculate final score 538 based on a learned probability distribution associated with source models 546. Scoring module 518, or more specifically statistical model 520, may generate a raw score value associated with a comparison of a mapping, projection, or graph of generated modality feature vectors and a source profile corresponding to the true source. Calibration module 522 may calibrate or transform the raw score value to final score 538 using multiclass logistic regression, for example. Calibration module 522 may calculate final score 538 as a log-likelihood ratio (LLR). Calibration module 522 may output final score 538 as an indication of a probability the multimodal content item originated from the purported source.

Figure 6:
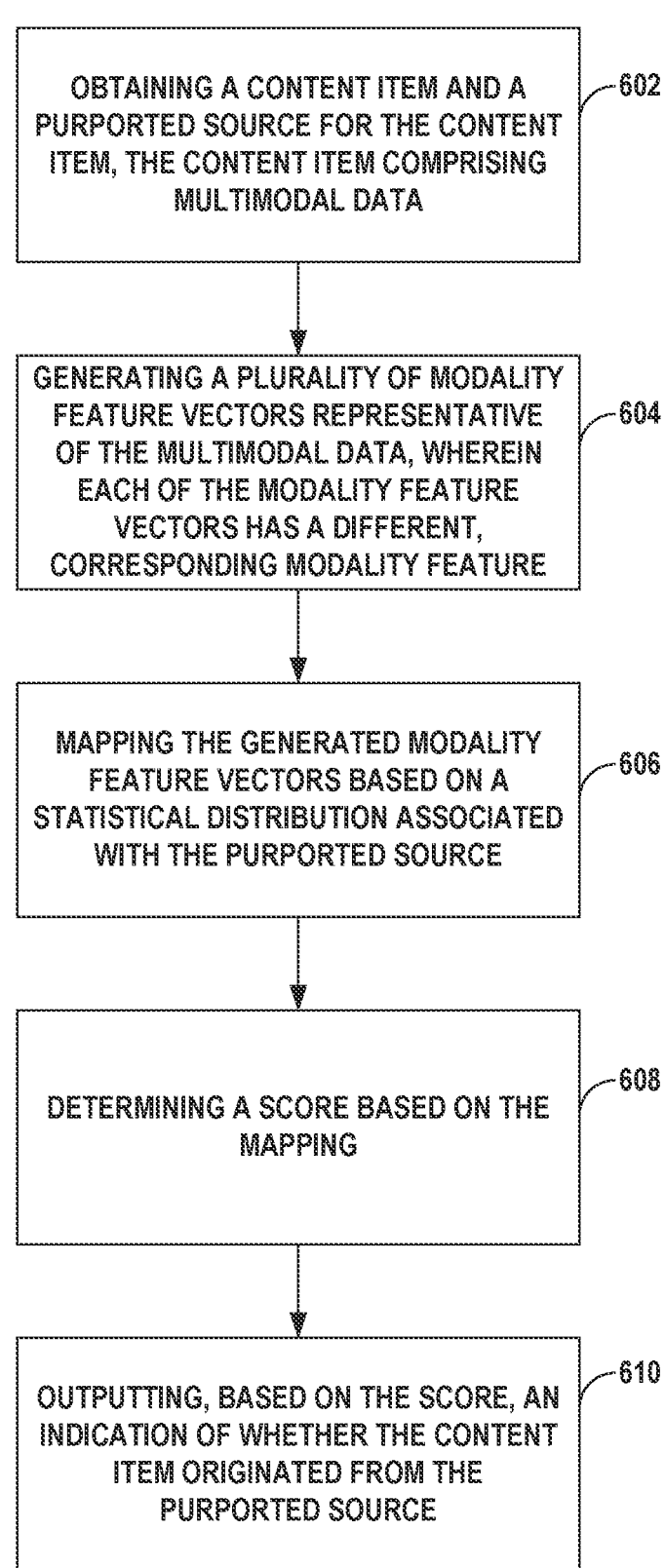
FIG. 6 is a flowchart illustrating an example mode of operation for source attribution verification, according to techniques described in this disclosure.

FIG. 6 is a flowchart illustrating an example mode of operation for source attribution verification, according to techniques described in this disclosure. FIG. 6 is discussed with FIGS. 1-5 for example purposes only.

Computing system 100 may obtain a content item and a purported source for the content item (602). Computing system 100 may obtain a content item that may include multimodal data. Computing system 100 may generate modality feature vectors representative of the multimodal data (604). Computing system 100, or more specifically neural network 214, may generate modality feature vectors that have a different, corresponding modality feature. For example, neural network 214 may generate a modality feature vector for a modality feature corresponding to a title of the content item, a modality feature vector for a modality feature corresponding to an image of the content item, a modality feature vector for a modality feature corresponding to a caption of the content item, a modality feature vector for a modality feature corresponding to video of the content item, a modality feature vector for a modality feature corresponding to audio of the content item, and so on.

Computing system 100 may map the generated modality feature vectors to one or more feature characteristics associated with the purported source (606). For example, statistical model 220 may apply PLDA to map feature vectors 516 to a lower dimension subspace based on source models 546. Computing system 100 may determine a score based on the mapping of the modality feature vectors (608). For example, calibration module 222 of scoring module 218 may determine a LLR by calibrating feature mappings 426. Computing system 100 may output an indication (probability, ratio, or log likelihood ratio) of whether the content item originated from the purported source (610). For example, scoring module 218 may output the determined LLR or an associated indication of whether the content item originated from the purported source.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in computer-readable media, such as a computer-readable storage medium, containing instructions. Instructions embedded or encoded in one or more computer-readable storage mediums may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
obtaining, by a computing system, a content item and a purported media source for the content item, the content item comprising multimodal data;
generating, by the computing system, a plurality of modality feature vectors representative of the multimodal data, wherein each of the plurality of generated modality feature vectors has a different, corresponding modality feature;
mapping, by the computing system, the plurality of generated modality feature vectors based on a statistical distribution associated with the purported media source;
determining, by the computing system, a score based on the mapping; and
outputting, by the computing system and based on the score, an indication of whether the content item originated from the purported media source.

2. The method of claim 1, wherein mapping the plurality of generated modality feature vectors based on the statistical distribution associated with the purported media source further comprises:
creating, by the computing system, a source profile for the purported media source based on training data samples; and
mapping, by the computing system, using the source profile, the plurality of generated modality feature vectors based on the statistical distribution associated with the purported media source.

3. The method of claim 1, further comprising:
outputting, by the computing system, an indication of whether the content item originated from other media sources if the content item did not originate from the purported media source.

4. The method of claim 1, wherein generating the plurality of modality feature vectors representative of the multimodal data further comprises:

providing the content item to one or more neural networks trained to encode items of a given content type;

extracting multimodal data for a plurality of features from the content item, each feature of the plurality of features corresponding to a modality feature of the content item; and for each feature of the plurality of features, encoding multimodal data associated with the feature into a corresponding modality feature vector.

5. The method of claim 1, wherein each of the plurality of generated modality feature vectors corresponds to a modality feature comprising one of a title of the content item, a body of the content item, one or more images of the content item, one or more captions of the content item, audio of the content item, or video of the content item, and wherein mapping the plurality of generated modality feature vectors based on the statistical distribution associated with the purported media source comprises generating a feature mapping for each modality feature vector.

6. The method of claim 5, wherein determining the score based on the mapping comprises:

determining a feature score for each feature mapping; and determining the score by fusing each of the feature scores.

7. The method of claim 1, wherein generating the plurality of modality feature vectors comprises fusing the plurality of generated modality feature vectors into a concatenated modality feature vector, and wherein mapping the plurality of generated modality feature vectors comprises mapping the concatenated modality feature vector based on the statistical distribution associated with the purported media source.

8. The method of claim 1, wherein determining the score based on the mapping comprises:

generating one or more raw score values using probabilistic linear discriminant analysis; and generating the indication of whether the content item originated from the purported media source by calibrating the one or more raw score values using multiclass logistic regression.

9. A computing system comprising:

an input device configured to receive a content item and a purported media source for the content item, the content item comprising multimodal data;

processing circuitry and memory configured to execute a machine learning system, wherein the machine learning system is configured to:

generate a plurality of modality feature vectors representative of the multimodal data of the content item, wherein each of the plurality of generated modality feature vectors has a different, corresponding modality feature;

map the plurality of generated modality feature vectors based on a statistical distribution associated with the purported media source;

determine a score based on the mapping; and output, based on the score, an indication of whether the content item originated from the purported media source.

10. The computing system of claim 9, wherein to map the plurality of generated modality feature vectors based on the statistical distribution associated with the purported media source, the machine learning system is further configured to:

create a source profile for the purported media source based on training data samples; and map the plurality of generated modality feature vectors based on the statistical distribution associated with the purported media source using the source profile.

11. The computing system of claim 9, wherein the machine learning system is further configured to:

output an indication of whether the content item originated from other media sources if the content item did not originate from the purported media source.

12. The computing system of claim 9, wherein to generate the plurality of modality feature vectors representative of the multimodal data, the machine learning system is further configured to:

provide the content item to one or more neural networks trained to encode items of a given content type;

extract multimodal data for a plurality of features from the content item, a feature of the plurality of features corresponding to a modality feature of the content item; and for each feature of the plurality of features, encoding multimodal data associated with the feature into a corresponding modality feature vector.

13. The computing system of claim 9, wherein each of the plurality of generated modality feature vectors correspond to a modality feature comprising a title of the content item, a body of the content item, one or more images of the content item, one or more captions of the content item, audio of the content item, or video of the content item, and wherein to determine the score based on the mapping, the machine learning system is configured to:

generate a feature mapping for each modality feature vector;

determine a feature score for each feature mapping; and determine the score by fusing each of the feature scores.

14. The computing system of claim 9, wherein to generate the plurality of modality feature vectors, the machine learning system is further configured to:

fuse the plurality of generated modality feature vectors into a concatenated modality feature vector; and map the concatenated modality feature vector based on the statistical distribution associated with the purported media source.

15. The computing system of claim 9, wherein to determine the score based on the mapping, the machine learning system is configured to:

generate one or more raw score values using probabilistic linear discriminant analysis; and generate the indication of whether the content item originated from the purported media source by calibrating the one or more raw score values using multiclass logistic regression.

16. The computing system of claim 9, wherein the indication of whether the content item originated from the purported media source comprises one of a probability, ratio, or loglikelihood ratio.

17. Non-transitory computer-readable storage media comprising machine readable instructions for configuring processing circuitry to:

obtain a content item and a purported media source for the content item, the content item comprising multimodal data;

generate a plurality of modality feature vectors representative of the multimodal data, wherein each of the plurality of generated modality feature vectors has a different, corresponding modality feature;

map the plurality of generated modality feature vectors based on a statistical distribution associated with the purported media source;

determine a score based on the mapping; and output, based on the score, an indication of whether the content item originated from the purported media source.

18. The non-transitory computer-readable storage media of claim 17, wherein each of the plurality of generated modality feature vectors correspond to a modality feature comprising a title of the content item, a body of the content item, one or more images of the content item, one or more captions of the content item, audio of the content item, or video of the content item, and wherein to determine the score based on the mapping, the processing circuitry is configured to:

generate a feature mapping for each modality feature vector;

determine a feature score for each feature mapping; and determine the score by fusing each of the feature scores.

19. The method of claim 1, further comprising generating the statistical distribution according to a plurality of training content items corresponding to the purported media source.

20. The method of claim 1, wherein the indication of whether the content item originated from the purported media source comprises an indication of whether the content item was published by the purported media source.

\* \* \* \* \*